United States Patent
Duchateau (10) Patent No.: US 11,135,751 B2
(45) Date of Patent: Oct. 5, 2021

(54) OVER-MOLDED PREFORM SYSTEM AND METHOD

(71) Applicant: Plastipak Packaging, Inc., Plymouth, MI (US)

(72) Inventor: Roald Duchateau, Brasschaat (BE)

(73) Assignee: Plastipak Packaging, Inc., Plymouth, MI (US)

( * ) Notice: Subject to any disclaimer, the term of this patent is extended or adjusted under 35 U.S.C. 154(b) by 692 days.

(21) Appl. No.: 15/678,198

(22) Filed: Aug. 16, 2017

(65) Prior Publication Data

US 2018/0050477 A1    Feb. 22, 2018

Related U.S. Application Data

(60) Provisional application No. 62/375,792, filed on Aug. 16, 2016.

(51) Int. Cl.
*B29C 45/16*    (2006.01)
*B29C 45/42*    (2006.01)
(Continued)

(52) U.S. Cl.
CPC ...... *B29C 45/1628* (2013.01); *B29C 45/1618* (2013.01); *B29C 45/1625* (2013.01); *B29C 45/1759* (2013.01); *B29C 45/1761* (2013.01); *B29C 45/42* (2013.01); *B29B 2911/1414* (2013.01); *B29C 45/1646* (2013.01); *B29C 45/1684* (2013.01); *B29C 49/221* (2013.01); *B29C 2045/1626* (2013.01)

(58) Field of Classification Search
CPC ............ B29C 45/1625; B29C 45/1646; B29C 45/1684; B29C 45/045; B29C 45/1628; B29C 49/221; B29B 2911/1414; B29B 11/08
See application file for complete search history.

(56) References Cited

U.S. PATENT DOCUMENTS 4,422,995 A    12/1983  Schad
4,439,133 A *   3/1984  Rees ...................... B29C 45/40
                                                              425/556

(Continued)

FOREIGN PATENT DOCUMENTS

CN              102317051 A       1/2012

OTHER PUBLICATIONS

International Search Report, PCT/US2017/047092, dated Oct. 31, 2017.
Euopean Search Report EP17842041, dated Feb. 6, 2020.

*Primary Examiner* — Joseph S Del Sole
*Assistant Examiner* — Jerzi H Moreno Hernandez
(74) *Attorney, Agent, or Firm* — Fishman Stewart PLLC (57) ABSTRACT

A system for forming injection molded articles includes a turret, a first mold unit, and a second mold unit. In an embodiment, the turret includes a plurality of core plates and each core plate includes a plurality of core pins. The first mold unit may be configured to form an inner injection molded layer, and the second mold unit may be configured to form an outer injection molded layer over the inner injection molded layer. In an embodiment, the first mold unit and the second mold unit are configured to mold at the same time, and to provide opposing clamping forces. Processes involving over-molded articles are also disclosed.

15 Claims, 6 Drawing Sheets

(51) Int. Cl.
    *B29C 45/17*   (2006.01)
    *B29C 49/22*   (2006.01)

(56) References Cited

U.S. PATENT DOCUMENTS

| | | | |
|---|---|---|---|
| 5,728,409 A * | 3/1998 | Schad | B29C 45/045 |
| | | | 264/297.8 |
| 5,817,345 A * | 10/1998 | Koch | B29C 45/045 |
| | | | 425/130 |
| 6,143,225 A | 11/2000 | Domodossola et al. | |
| 6,783,346 B2 | 8/2004 | Bodmer et al. | |
| 7,946,836 B2 | 5/2011 | Sicilia | |
| 8,398,392 B2 * | 3/2013 | Yankov | B29C 45/33 |
| | | | 425/546 |
| 9,381,692 B2 | 7/2016 | Olaru | |
| 2004/0185136 A1 | 9/2004 | Domodossola et al. | |
| 2004/0256763 A1 * | 12/2004 | Collette | B29C 45/1625 |
| | | | 264/255 |
| 2006/0108702 A1 * | 5/2006 | Rossanese | B29C 45/045 |
| | | | 264/40.5 |
| 2007/0087131 A1 * | 4/2007 | Hutchinson | C08J 7/04 |
| | | | 427/533 |
| 2008/0258353 A1 * | 10/2008 | Hutchinson | B29C 45/1618 |
| | | | 264/483 |
| 2009/0136610 A1 | 5/2009 | Boucherie | |
| 2012/0086141 A1 * | 4/2012 | Jung | B29C 45/045 |
| | | | 264/39 |
| 2014/0134366 A1 * | 5/2014 | Armbruster | B29C 45/1628 |
| | | | 428/35.7 |
| 2014/0335219 A1 * | 11/2014 | Altonen | B29C 45/045 |
| | | | 425/576 |
| 2016/0151935 A1 | 6/2016 | Simpson | |

* cited by examiner

OVER-MOLDED PREFORM SYSTEM AND METHOD

CROSS-REFERENCE TO RELATED APPLICATION

This application claims the benefit of U.S. Provisional Patent Application Ser. No. 62/375,792, filed on Aug. 16, 2016, the disclosure of which is hereby incorporated herein by reference in its entirety.

TECHNICAL FIELD

The present invention relates generally to systems for forming injection-molded articles, including injection-molded preform systems and processes for making injection-molded preforms.

BACKGROUND

Conventional systems for providing over-molded preforms often involve molding of an injection molded inner layer, followed by movement to a second array of mold cavities and an over-molding of another injection-molded layer. Such systems commonly involve a sequential process in which an array of corepins are axially aligned with respect to a first mold array (to form a first/inner layer). The array of corepins is then subsequently shifted or indexed vertically or horizontally and is axially aligned with respect to a second mold array, and another/outer layer is formed over the first/inner layer. However, among other things, such conventional systems may not maximize cavitation and may require more clamp force, as the molding of each layer may require a full and discrete clamp force for both a first and a second mold array as one single clamp system has to hold all arrays of molds closed at the same time.

Consequently, there remains a desire for a system that more effectively and efficiently provides over-molded articles, such as plastic preforms.

SUMMARY

A system for forming injection molded articles includes a turret, a first mold unit, and a second mold unit. In an embodiment, the turret includes a plurality of core plates and each core plate includes a plurality of core pins. The first mold unit may be configured to form an inner injection molded layer, and the second mold unit may be configured to form an outer injection molded layer over the inner injection molded layer. In an embodiment, the first mold unit and the second mold unit are configured to mold at the same time and to provide opposing clamping forces. Processes involving over-molded articles are also disclosed.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
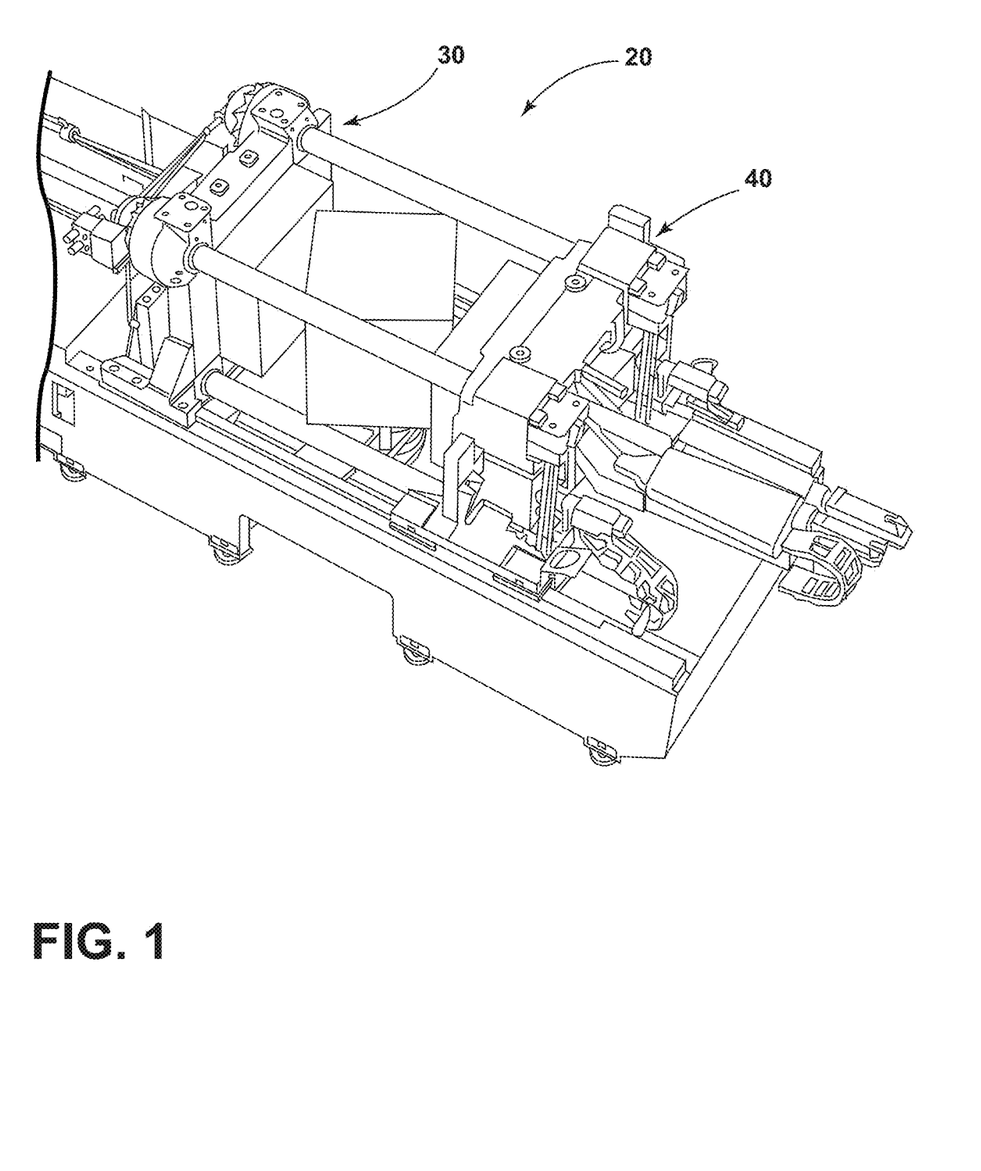
FIG. 1 is a perspective view of an embodiment of an over-molding system in accordance with aspects and teachings of the present disclosure.

By way of example only, and without limitation, FIG. 1 generally illustrates an embodiment of an over-molding system 20 in accordance with aspects and teachings of the present disclosure. The system 20 may include an injection press and two extruders. The system may also include a component (e.g., a cube-shaped turret) that has a plurality of core faces (e.g., four core faces). As generally illustrated, a first unit 30 may comprise a stationary platen and may be connected to a standard hot runner (for a first material), and a second unit 40 may comprise a moving platen and may be connected to a standard hot runner (for a second/different material). The system 20 may include cavity plates and stripper plates, and/or end-of-arm tooling (EOAT), such as an EOAT plate.

Figure 2:
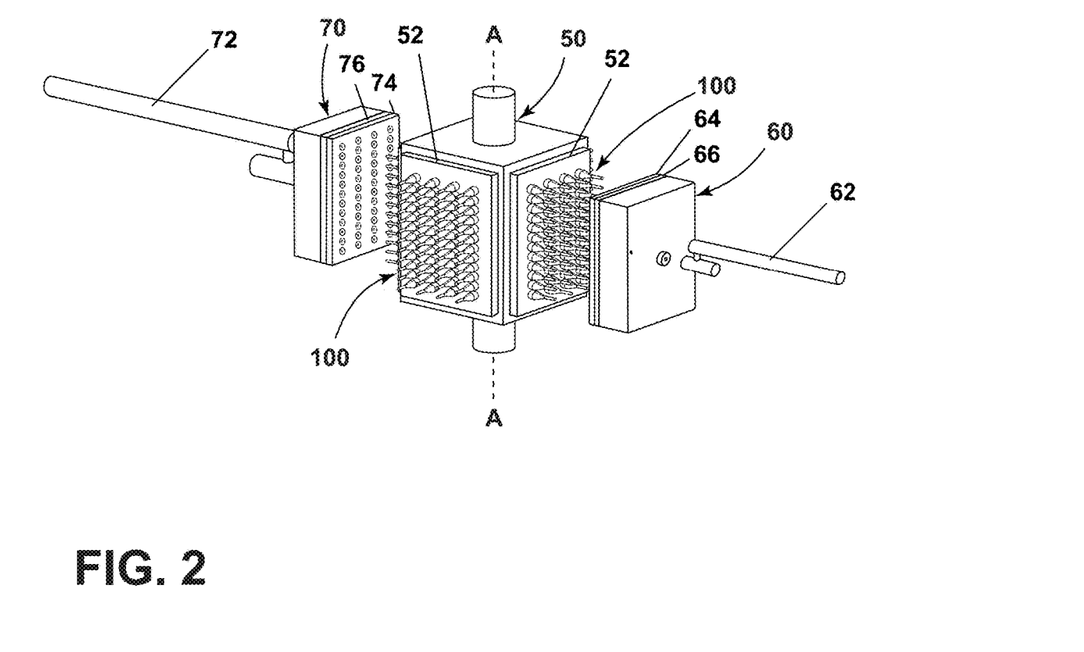
FIGS. 2, 3, and 4 are perspective view illustrations of configurations of components associated with embodiments of the present disclosure.
Figure 3:
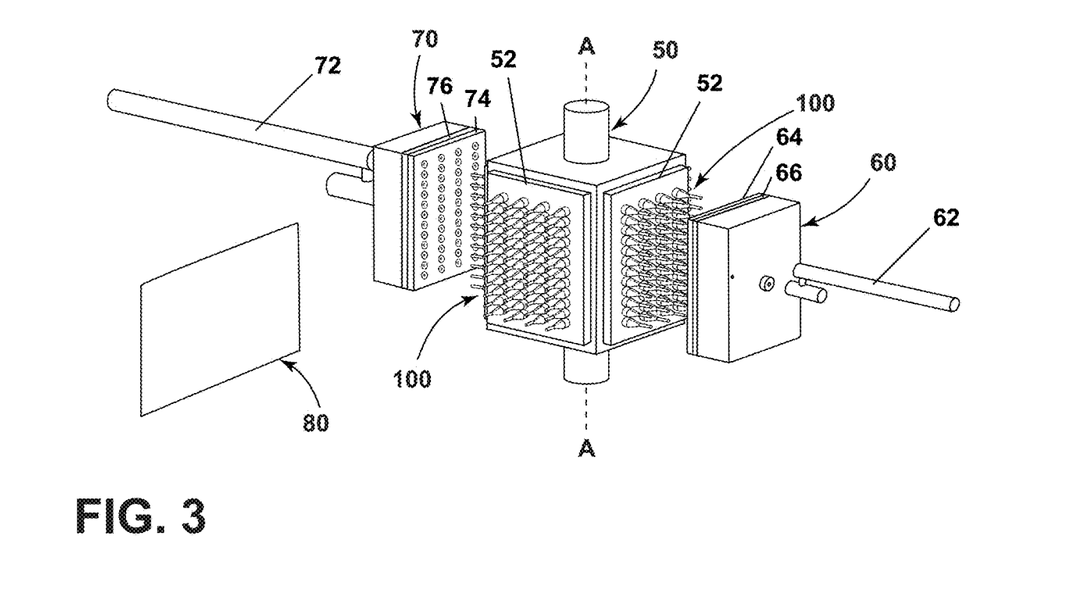
Figure 4:
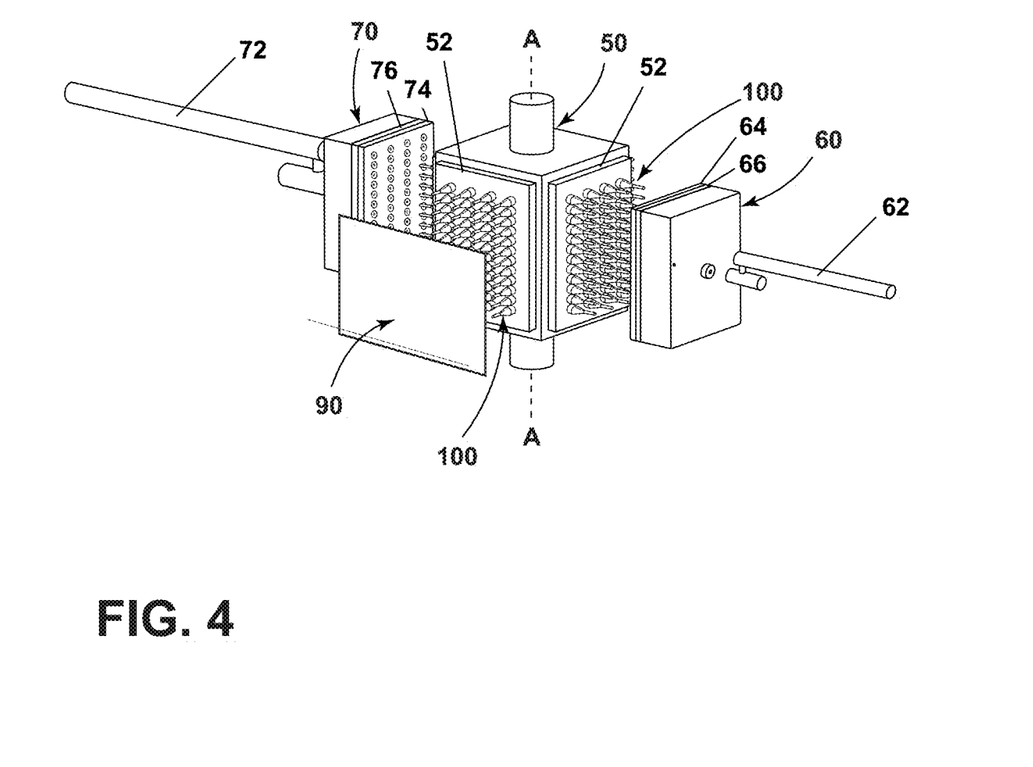

FIGS. 2, 3, and 4 generally illustrate configurations of components associated with embodiments of systems. As generally illustrated in FIG. 2, an embodiment of a system 20 may include, without limitation, a turret 50; a first mold unit (or first mold array) 60, which may include a hot runner 62; and a second mold unit (or second mold array) 70, which may include a hot runner 72). An embodiment of a turret 50 may comprise, for example, four core plates 52 with core pins 100 and a stripper plate to facilitate ejection. With an embodiment, the first mold unit 60 may be configured to form an inner layer contour, and the second mold unit 70 may be configured to form a full preform/outer contour. In an embodiment the first mold unit 60 may include a cavity plate 64 and stripper plate 66, and may be configured to provide a first plastic material (e.g., black polyethylene terephthalate (PET)). In a similar manner, the second mold unit 70 may include a cavity plate 74 and a necksplit plate 76, and may be configured to provide a second plastic material (e.g., white PET), possibly in two stages. By way of example and without limitation, the system may manufacture light barrier plastic preforms for blow molding operations.

FIG. 3 is similar to FIG. 2. However, an embodiment of an EOAT plate 80, which may be associated with the second mold unit 70 function is generally illustrated. End-of-arm tooling may perform tasks such as post mold cooling, sprue picking and demolding or other tasks such as de-gating, insert loading, part orientation, and assembly. With reference to the figures, the EOAT plate 80 may, for example, be disposed on a "Z"-axis between a cavity plate and the turret 50. Moreover, with reference to an embodiment of the process, as described further herein, the EOAT plate 80 may be effectuated after a third phase (after mold open).

With reference to FIG. 4, in embodiments, another or a second EOAT plate 90 may be associated with a fourth rotary position of a turret 50. An EOAT plate 90 may, for example, be disposed on a "Z"-axis facing a final fourth rotary location associated with the turret 50 (when the mold is closed). That is, with embodiments, the another or second EOAT plate 90 may be similar to that of EOAT plate 80, previously described, but may be provided at an alternate location.

An embodiment of a method or process associated with the disclosure is generally described, by way of example and without limitation, with reference to FIGS. 5A through 5D. In an embodiment, the turret 50 may generally comprise a cube that rotates about an axis (A) and includes four core faces. Each of the four core faces may include a plurality of core pins 100, which may be arranged in a substantially similar array or configuration.

Figure 5A:
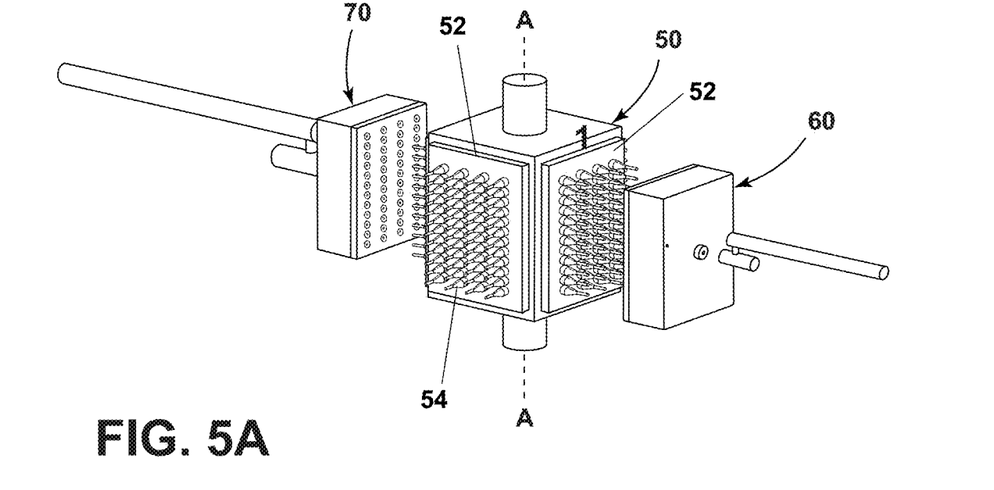
FIGS. 5A through 5D generally illustrate an embodiment of a process associated with aspects and teachings of the present disclosure.

With initial reference to FIG. 5A, in a first position of the turret 50, Phase 1 (identified by the numeral "1" in the figure), the first and second mold unit 60,70 may operatively engage the turret 50 and respective faces of core pins. A first plastic material (e.g., black PET or another material) may be molded over the array of core pins presented to the first mold unit in Phase 1. As disclosed further herein, another clamping and molding process may occur at the same time at an opposing Phase 3 position.

Figure 5B:
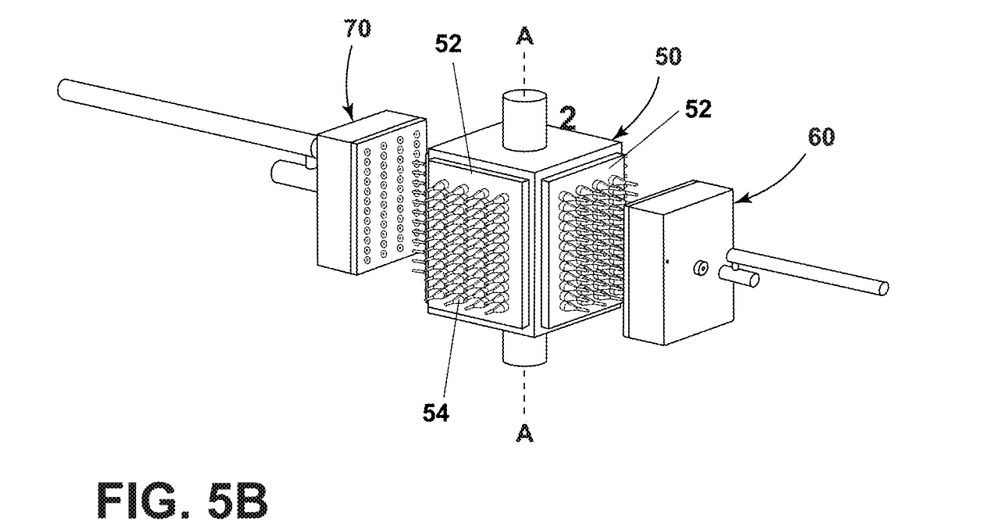

After the process associated with the molding at Phase 1, the turret 50 may rotate (e.g., 90° counterclockwise or clockwise so that the process is inversed but a similar sequencing/result may be achieved) about axis A to a second position—i.e., Phase 2 (e.g., as identified by the numeral "2" in FIG. 5B). The intermediate articles (e.g., first/inner layer of materials that were just formed on the array of core pins in Phase 1) may be conditioned in Phase 2. For example, the intermediate articles may be heated or otherwise treated in some manner with an objective of keeping at least the outer layer or skin layer at a desired temperature. Keeping at least the outer layer or skin layer at a desired temperature may, for example, help facilitate bonding between two overmolded materials in connection with subsequent over-molding or formation. It is noted that another or alternative method/process with a similar system would allow the turret 50 to rotate 180° without the need for an intermediate 90° stop (e.g., for conditioning). With such an embodiment, the part ejection after molding and mold opening may be configured to take place before the 180° rotation.

Figure 5C:
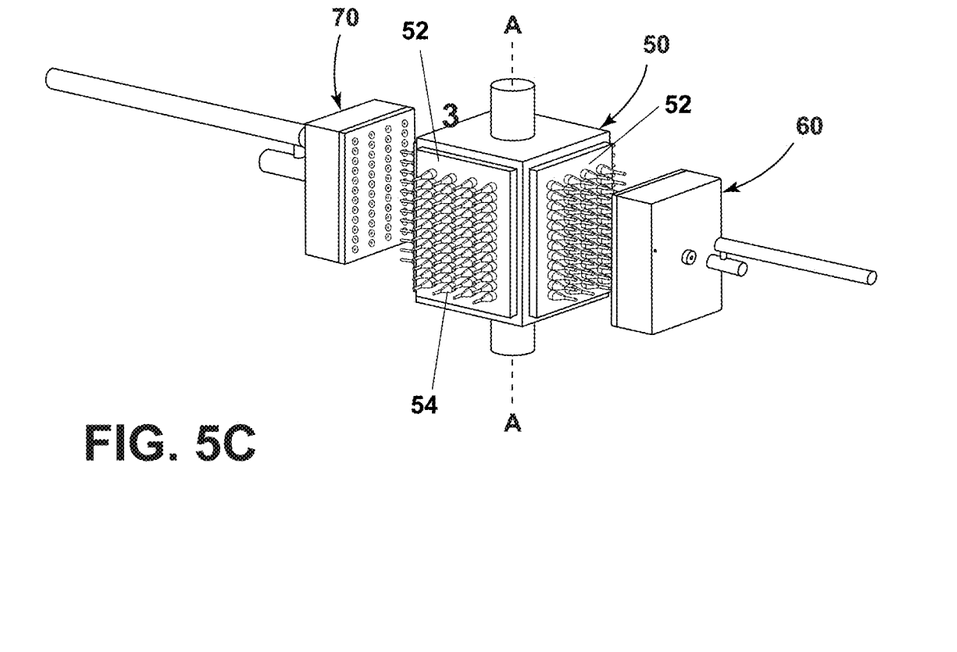

After the process associated with Phase 2, the turret 50 may rotate (e.g., 90° counterclockwise) about axis A to a third position—i.e., Phase 3 (e.g., as identified by the numeral "3" in FIG. 5C). In connection with Phase 3, and with reference to the second mold unit 70, another layer of material may be molded over the intermediate articles that were formed on the array of core pins in Phase 1. As the molding associated with Phase 1 and the over-molding associated with Phase 3 are performed on opposing sides of the turret, and generally at the same time, the forces used to engage (e.g., clamp) the respective molds may be used to generally counteract each other. With such a configuration, two materials (one associated with the first mold unit 60 and another associated with the second mold unit 70) may be injected at the same time without requiring twice the clamp force associated with separate sequential molding. The ability to utilize countervailing forces can, among other things, provide greater efficiency. For instance, with some applications, an input of 15% to 20% more clamp force (e.g., in association with Phases 1 and 3), may cover twice the project surface (i.e., cover the molding of two full arrays of pins). Moreover, embodiments of the system can save space as compared to conventional systems by providing a comparatively smaller system for the same or even greater article output.

Figure 5D:
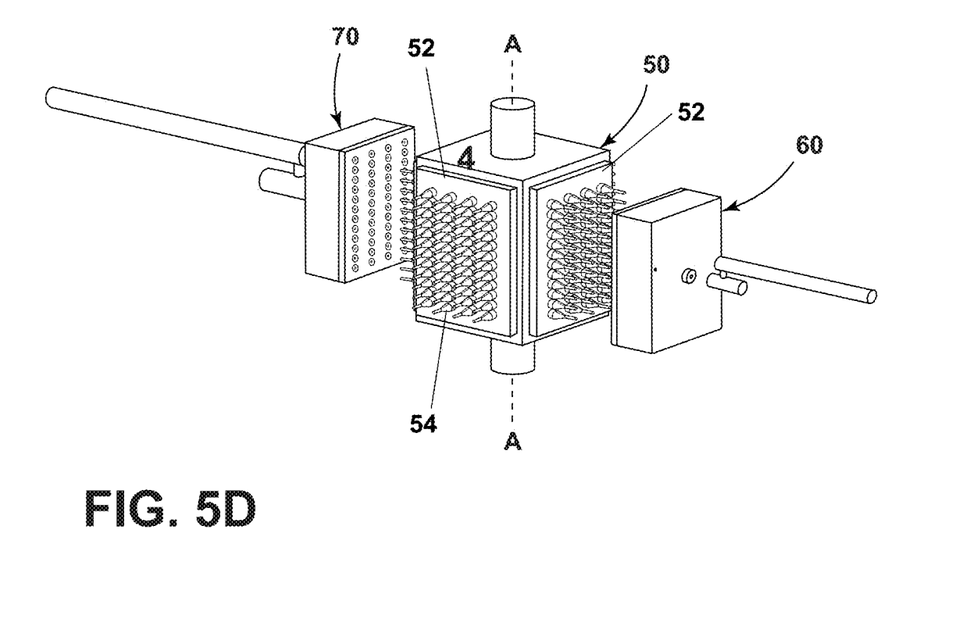

After the process associated with Phase 3, the turret 50 may rotate (e.g., 90° counterclockwise) about axis A to a fourth position—i.e., Phase 4 (e.g., as identified by the numeral "4" in FIG. 5D). In connection with Phase 4, the now-formed preforms may be removed from the turret 50. The manner of removal may, for example, involve an EOAT or other mechanism. For example and without limitation, in an embodiment a take-off plate may be employed at Phase 4 and the formed preforms may free drop for collection. Alternatively, a stripper plate or picker plate may also be utilized.

Once the articles are removed in Phase 4, and the new intermediate articles are molded in Phase 1, the turret may rotate back so that the face that just had the formed articles removed is moved back to the Phase 1 position, and the process may repeat.

Embodiments of the system may be used to provide articles or preforms that have a first/inner injection molded layer and a second/outer injection molded layer. With general reference to FIG. 6, and without limitation, in embodiments a preform 110 that includes a neck portion 112 and a body portion 114. The preform 110 may be formed that includes an inner layer 120 (e.g., formed at Phase 1) that provides some form of desired function, such as providing a barrier and/or oxygen scavenger. For example, the inner layer 120 may comprise a material that, among other things, serves to protect contents from ultraviolet (UV) and/or visible light. The outer layer 130 (e.g., formed at Phase 3) may comprise PET and/or various other polymer materials, and may, for some application, comprise post-consumer recycled (PCR) content.

Figure 6:
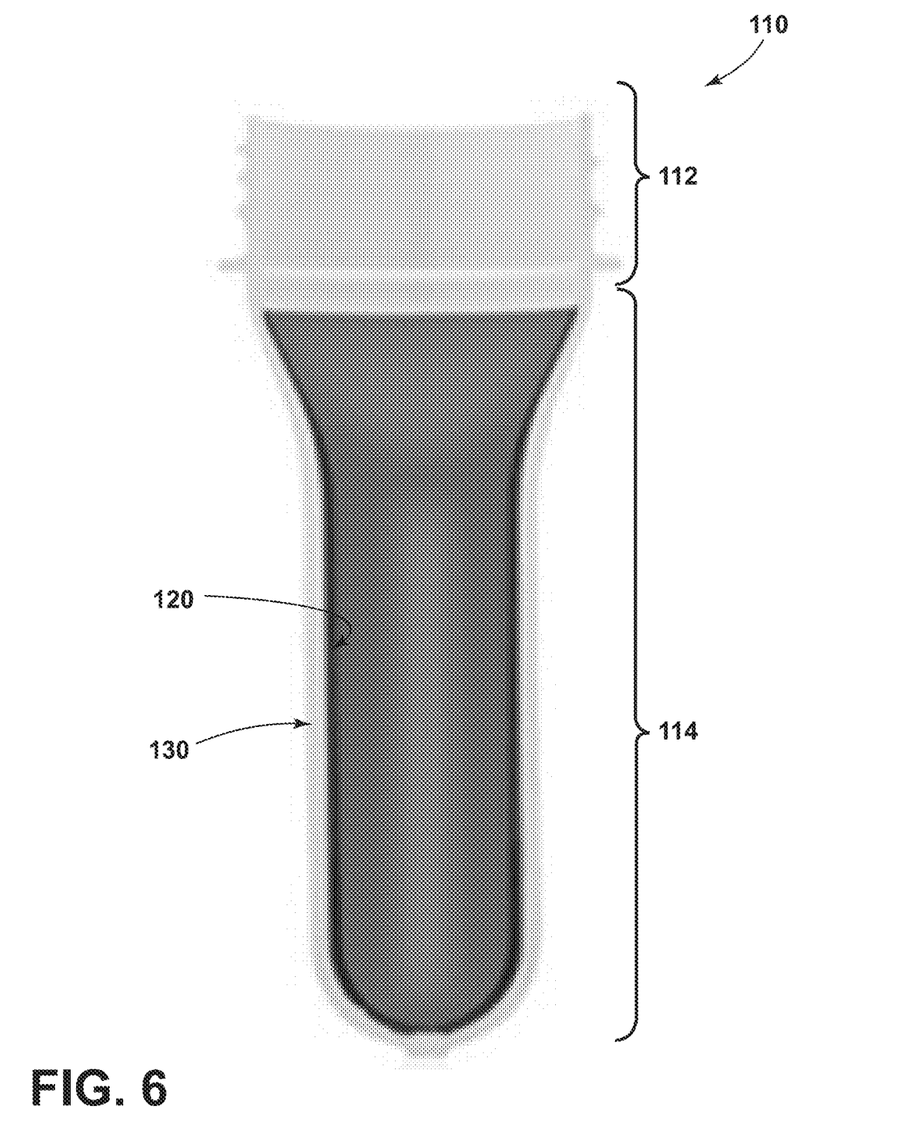
FIG. 6 generally illustrates a side view cross-section of an embodiment of a preform in accordance with aspects of the present disclosure.

Additionally, for some embodiments, the inner layer 120 (e.g., formed at Phase 1) may be an injected multi-layer. For example, a barrier and/or oxygen scavenger layer (or black PET layer) could be sandwiched between two other layers such that the barrier/scavenger layer (or black PET layer) would not be an innermost layer that contacts container contents. The disclosed concepts provide a number of options/variations with respect to the formation of articles, such as preforms. For example and without limitation, the system may produce: (a) two-component preforms (e.g., with a finish having one material/color and body with another); a preform with just the base portion in another material (e.g., to provide additional/different properties in that portion of a blown container); a ribbed two-component preform that has ribs of alternating materials or colors along its axis (e.g., to provide support and/or stretch functions—such as a rubber and PET).

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A system for forming injection molded articles comprising:
- a turret including a plurality of core plates, each core plate of the plurality of core plates including a plurality of core pins;
- a first mold unit configured to form an inner injection molded layer for each of the core plates at a first turret position; and
- a second mold unit configured to form an outer injection molded layer over each inner injection molded layer for each of the core plates at a third turret position;
- a first end-of-arm-tooling (EOAT) plate, wherein the first EOAT plate is associated with the second mold unit, configured to be disposed on an axis between the second mold unit and the turret when the first mold unit and the second mold unit are in an open state, and configured to perform at least one of post mold cooling, sprue picking, de-gating, insert loading, part orientation, or assembly in the third turret position while the first mold unit and the second mold unit are in the open state;
- a second EOAT plate, wherein the second EOAT plate is associated with a fourth turret position, configured to be disposed on an axis facing the turret in the fourth turret position when the first mold unit and the second mold unit are in a closed state, and configured to remove injection molded articles from each of the core plates at the fourth turret position while the first mold unit and the second mold unit are in the closed state;
- wherein the first mold unit is configured to form the inner injection molded layer for one of the core plates simultaneously with the second mold unit forming the outer injection molded layer over the inner injection molded layer for another of the core plates on an opposing side of the turret as the one of the core plates during which the first mold unit and the second mold unit are in the closed state and configured to provide opposing clamping forces while the inner injection molded layer for other one of the core plates disposed between the opposing core plates at a second turret position is heated;
- wherein the first EOAT plate is configured to perform at least one of post mold cooling, sprue picking, de-gating, insert loading, part orientation, or assembly for each of the core plates at the third turret position after the first mold unit forms the inner injection molded layer and the second mold unit forms the outer injection molded layer and while the first mold unit and the second mold unit are in the open state;
- wherein the second EOAT plate is configured to remove injection molded articles from each of the core plates at the fourth turret position while the first mold unit forms the inner injection molded layer and the second mold unit forms the outer injection molded layer and while the first mold unit and the second mold unit are in the closed state; and
- wherein the first turret position, the second turret position, the third turret position, and the fourth turret position are approximately 90 degrees rotationally offset from an adjacent position.

2. The system of claim 1, including two hot runners.

3. The system of claim 1, wherein the first mold unit is configured to be stationary, and the second mold unit is configured to move toward and away from the first mold unit.

4. The system of claim 1, wherein the first mold unit is connected to a first hot runner, and the second mold unit is connected to a second hot runner.

5. The system of claim 4, wherein the first hot runner supplies a first material, and the second hot runner supplies a second material.

6. The system of claim 1, including at least one of a cavity plate and a stripper plate.

7. The system of claim 1, wherein the plurality of core plates includes four core plates.

8. The system of claim 7, wherein the turret includes a stripper plate to facilitate ejection of molded articles.

9. The system of claim 1, wherein the inner injection molded layer comprises polyethylene terephthalate (PET) or a barrier material.

10. The system of claim 1, wherein the second mold unit includes a cavity plate and a necksplit plate.

11. The system of claim 1, wherein the second mold unit is configured to provide a plastic material in more than one stage.

12. A method for forming injection molded articles comprising:
- providing a first mold unit, a second mold unit, and a turret including a plurality of core plates, each core plate of the plurality of core plates including a plurality of core pins, wherein the turret is disposed between the first mold unit and the second mold unit;
- molding an inner injection molded layer for one of the core plates in a first turret position;
- rotating the turret so that the one of the core plates is in a second turret position;
- heating the inner injection molded layer for the one of the core plates;
- rotating the turret so that the one of the core plates is in a third turret position, the third turret position opposing the first turret position, and another one of the core plates is in the first turret position;
- molding an outer injection molded layer over the inner injection molded layer for the one of the core plates in the third turret position and an inner injection molded layer for the another one of the core plates in the first turret position, wherein counteracting clamping forces are used with molding of the inner injection molded layer for the another one of the core plates and the outer injection molded layer;
- providing a first end-of-arm-tooling (EOAT) plate, wherein the first EOAT plate is associated with the second mold unit, configured to be disposed on an axis between the second mold unit and the turret when the first mold unit and the second mold unit are in an open state, and configured to perform at least one of post mold cooling, sprue picking, de-gating, insert loading, part orientation, or assembly while the first mold unit and the second mold unit are in the open state;
- performing at least one of post mold cooling, sprue picking and demolding, de-gating, insert loading, part orientation, or assembly in the third turret position via the first end-of-arm-tooling plate after the first mold unit forms the inner injection molded layer and the second mold unit forms the outer injection molded layer and while the first mold unit and the second mold unit are in the open state;
- rotating the turret so that the one of the core plates is in a fourth turret position;
- providing a second end-of-arm-tooling (EOAT) plate, wherein the second EOAT plate is associated with the fourth turret position, configured to be disposed on an axis facing the one of the core plates in the fourth turret position when the first mold unit and the second mold unit are in a closed state, and configured to remove injection molded articles from the one of the core plates in the fourth turret position while the first mold unit and the second mold unit are in the closed state; and removing molded articles from the one of the core plates at the fourth turret position via the second EOAT plate while the first mold unit forms another inner injection molded layer and the second mold unit, forms another outer injection molded layer and while the first mold unit and the second mold unit are in the closed state.

13. The method of claim 12, wherein the inner injection molded layer for the another one core plates at the first turret position and the outer injection molded layer over the inner injection molded layer for the one the core plates at the third turret position are molded at substantially the same time.

14. The method of claim 12, including use of at least one of a cavity plate and a stripper plate.

15. The method of claim 12, including rotating the turret from the fourth position to the first turret position.

\* \* \* \* \*